United States Patent Office 3,395,192
Patented July 30, 1968

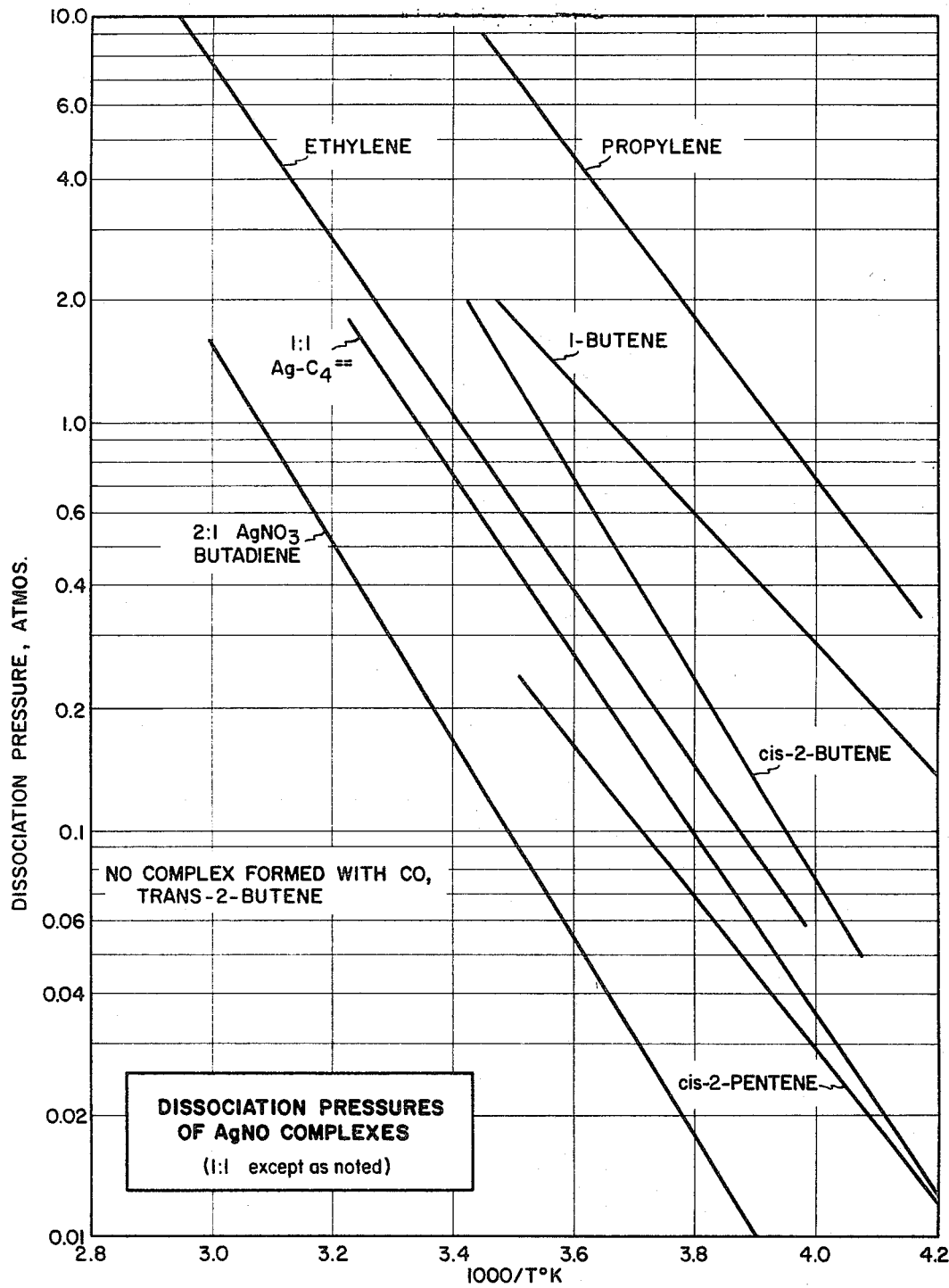

3,395,192
ETHYLENE RECOVERY BY SILVER
NITRATE COMPLEXING
Robert B. Long, Atlantic Highlands, N.J., assignor to Esso
Research and Engineering Company, a corporation of
Delaware
Filed May 3, 1965, Ser. No. 452,576
4 Claims. (Cl. 260—677)

ABSTRACT OF THE DISCLOSURE

High porosity solid silver salts prepared by complexing and decomplexing with a complexible ligand are utilized to separate compounds from mixtures thereof, e.g., cis monoolefins from trans monoolefins.

---

This invention relates to novel high large pore porosity solid silver salts selected from the group consisting of $AgNO_3$, $AgClO_4$, $AgClO_3$, $AgBF_4$ and $Ag_2SiF_6$ useful as superior complexing agents i.e., having extremely high capacity (theoretical capacity approached in e.g., 30 minutes) and extremely high activity (nearly complete removal of desired materials occurs in ~1 second gas residence time) and for other purposes such as catalysts. More particularly, this invention relates to processes for preparing such solid silver salts by (1) precipitating or growing from solution solid complexes of such salts with particular complexing compounds (ligands) i.e., those which form a stable complex having a ratio of silver to complexing compound greater than 1:1, preferably 2:1 or more e.g., butadiene and (2) separating and dissociating the solid complexed salts to obtain the desired high large pore porosity solid silver salts. The preferred process for preparing these salts utilizes the following steps: (1) the particular silver salt is dissolved in a liquid media such as water or alcohol, (2) the liquid media containing the dissolved salt, preferably saturated with the salt is reacted with the particular complexing compounds (ligands) above defined to obtain a solution of the complexed salt, (3) the complexed salt is precipitated or crystallized from the liquid media, e.g., by cooling, etc. and (4) the complexed salt is separated and then decomplexed, e.g., by heating to prepare the high large pore porosity silver salt. This invention further relates to the use of the new solid silver salts of this invention as complexing agents in the separation of a ligand, e.g., cis olefins from a mixture of materials including, e.g., trans olefins containing the ligand. In a particularly preferred embodiment this invention relates to the use of these high capacity and activity solid silver salts as complexing agents in the separation of a component from a mixture containing it in which the said mixture is gaseous and the solid silver salts are employed in a fluidized state.

It is well known in the art that silver salts in general are capable of forming complexes with certain hydrocarbons and other compounds, which complexes are capable of being subsequently dissociated to generate the complexed hydrocarbon and/or other compounds in a relatively pure state. With this knowledge the prior art has suggested the use of solid silver salts in processes for the separation of hydrocarbons and other compounds from mixtures containing them. However, in general these processes have not been economic due to the low capacity and activity of the silver salts, and to the knowledge of the present inventor no commercial use of such processes was ever made. It has now surprisingly been discovered that high large pore porosity solid bulky anion silver salts, i.e., anions comprised of multiple atoms e.g., $AgNO_3$, $AgClO_4$, and $AgBF_4$ can be prepared having enormously superior properties. Thus, at least five fold greater capacity (i.e., amount of ligand absorbed in a short solids residence period, e.g., 30 minutes—100% vs. less than 20% of theoretical capacity of 1 mol diolefin per 2 mols of silver salt) is obtained along with in addition an activity 10 to 100 times greater than the best prior art (i.e., high purity) silver salts. The terms "active" and "activity" as employed herein refer to the rate at which a component will complex under a given set of conditions i.e. gas residence time required to obtain substantially complete removal of said components. It has further been discovered that the finely divided silver salt crystals so prepared when used in a fluid system are attrition resistant and fluidize smoothly over a wide range of gas flow rates. This smooth fluidization performance is very significant since due to the extremely high activity of the solid silver salts the exothermic complexing reaction is limited by the rate at which the enormous heat released in complexing can be removed i.e., to prevent temperature from rising above the optimum complexing temperature. This is economically effected in a fluidized operation using the present silver salts.

The present new high large pore porosity solid silver salts have the following physical characteristics:

(1) Porosity.—Above 10%, more preferably above 15%, yet more preferably above 25%, most preferably above 35% of total volume of the particle pores of 550/10,000 A. diameter, preferably preponderantly above 1000 A. diameter. Also, preferably particles have 0.1–15%, preferably 0.3–5%, most preferably 0.5–3% of total volume of pores of 1–550 A., preferably 70–550 A. (small pores permit condensation but amount is small enough so as not to limit activity on complexing or strippability (for product purity) due to diffusion limitations). It should be noted that the present large pore porosity is unusual in that conventional porous solids such as cracking catalyst, catalyst supports, adsorbents including molecular sieves, all have the bulk of their pore volume smaller than 100 A.

(2) Size.—Above about 50%, preferably above about 65%, more preferably above about 80% by weight of particles 5–5000μ, more preferably (for fluidization) 10–600μ, yet more preferably 30–200μ (average diameters). In all embodiments the particles are regularly unitary (rigid continuously joined structures, not small particles physically aggregated by surface effects only) particles grown from solution as complexed single particles or complexed macroparticles composed of continuously joined microparticles i.e., dendritically grown, which retain after dissociation within the porous structure the single particle or macroparticle composed of continuously joined microparticles structure, (rather than agglomerates of small particles rapidly nucleated from solution and then physically combined by surface attractions only i.e., typical agglomerates have considerably less strength than the present invention particles). A further proof of the (continuously joined) unitary rigid structure of the present porous particles both small single particles and macroparticles, and large spherical macroparticles is shown by the fact that the complexed particles have enormous strength, e.g., it has been found that complexed particles cannot be broken between two microscope slides by strong hand pressure. Typical normal aggregates even though complexed would be broken by such hand pressure.

(3) *Purity.*—Preferably above 95% $AgNO_3$, $AgClO_4$, $AgClO_3$, $AgBF_4$ or $Ag_2SiF_6$, more preferably above 99%, yet more preferably above 99.5% (the higher purities are desirable not only to obtain high activity and capacity in use i.e., maintenance of high large pore porosity but also to increase mechanical strength and to prevent undesirable side reactions in use). In preferred embodiments the gross morphology of the particles has been found to be triclinic platelets or needles in which the length and width are of the same order of magnitude and the thickness is one-tenth to one-half the width. Also dendrites of these materials are obtained. It is noted that these particles are of an excellent shape for fluidization. Other shapes may, of course, also be used in this invention.

The new silver salts of this invention are prepared by precipitating or growing from any solution solid complexes of the salt with particular complexing compounds (ligands) hereinafter described, separating the solid material from the solution, and dissociating the complex to obtain the desired high large pore porosity silver salt. Examples of general methods of preparation which produce complexed (with the proper complexing compound) solid particles from which the desired new high large pore porosity silver salts are obtained upon dissociation are:

(1) Precipitation of solid complexed particles from a liquid containing the complex in solution by either (a) change in temperature to decrease solubility or (b) addition of an antisolvent or (c) evaporation of solvent.

(2) Precipitation of solid complexed particles from the uncomplexed silver salt in solution in a solvent having a lower solubility for the complex than for the uncomplexed silver salt by either (a) addition of the complexing compound or (b) addition of the complexing compound and an antisolvent.

(3) Growth of solid complexed particles from the uncomplexed silver salt suspended (slurried) in a liquid mixture of the complexing compound and a solvent having a lower solubility for the complex than for the uncomplexed silver salt, the said mixture having a slight solubility for the silver salt so as to create a driving force whereby the complexing compound and solvent cause a phase boundary to move through the particle to in effect grow a new complexed particle.

In each of the above methods any solvent for the silver salt may be utilized, i.e., organic or inorganic, the choice being dictated by the relative solubility of the silver salt complex (more insoluble) vs. the solubility of the uncomplexed silver salt. Suitable solvents are water; anhydrous or aqueous (preferably single phase) alcohols, glycols, ketones, ethers (cyclic and acyclic including epoxides) esters and nitriles; concentrated or preferably dilute inorganic acids corresponding to the particular silver salt; and aqueous alkali metal or ammoniacal inorganic salt solutions corresponding to the particular silver salt. These solvents preferably boil in the range of $-50°$ C. to $200°$ C., more preferably $0°$ C. to $200°$ C., yet more preferably $20°$ C. to $100°$ C. Preferably, particularly for the embodiments where precipitation is effected at low temperatures, e.g., by cooling the solution, the solvent has a freezing point below $-40°$ C., more preferably below $-10°$ C. Examples of preferred solvents are: water, diethyl ether, tetrahydrofuran, ethylene glycol, acetone, butylene oxide, methyl and ethyl acetates or formates, $NH_4NO_3$, $NaNO_3$ and $KNO_3$, $HNO_3, HClO_4$, $HClO_3$, $HBF_4$ and $H_2SiF_6$. Preferred concentrations of dilute inorganic acids are 0.1–5 N, preferably 0.5–2 N.

Suitable antisolvents are concentrated solutions of the corresponding alkali metal or ammoniacal inorganic salt, ethers and where water is used as the solvent any of the other solvents (these generally have less solubility than water) may be used as antisolvents. Where nitriles are used as the solvent it is much preferred to use nitriles, preferably the same nitriles, also as the complexing compound.

Suitable complexing agents which can be used as described to prepare the active silver salts of this invention are any normally gaseous or liquid complexing compounds which form a stable complex having a ratio of silver to complexing compound greater than 1, preferably 2 or more. Such compounds are those having more than 1 pi bond per molecule. Such compounds include both materials which form only complexes having said ratios of silver to complexing compound greater than 1 and compounds which form complexes having a ratio of 1 or less which upon decomplexing pass through a stable complex having a ratio of silver to complexing compound greater than 1. Thus, the present inventor has found experimentally that certain materials, e.g., nitriles, diolefins, acetylenes, under ordinary conditions forming a 2:1 complex can be made to complex in ratios of solid complexing salt to complexing compound of 1:1 or less. However, upon dissociation complexing material is released selectively until the stable above 1:1, e.g., 2:1 stoichiometric complex is completely formed before further decomplexing to the uncomplexed metal salt occurs. In this specification by "stable complex" is meant a stoichiometric complex stable upon dissociation as described in the preceding sentence. As will be further discussed in the examples in connection with the experimental data it is the stable complex having a ratio of silver to complexing material of above 1:1 from which the large pores develop upon dissociation (due to the bonding of one molecule of the complexing material to more than one silver atom). Preferred materials are HCN and $C_2$–$C_{12}$ or higher organic compounds containing at least one of the following functional groups: (1) $>C=R=C<$ (polyolefins), (2) $-C\equiv C-$ or (3) $-C\equiv N$ and mixtures of these, wherein R is C or an alkylene group. More than one of these functional groups may be present in a single molecule. In addition other functional groups may be present so long as these do not interfere with complex formation. Preferred materials are $C_3$ to $C_{10}$ or higher, preferably $C_3$ to $C_6$ conjugated or nonconjugated aliphatic, cyclic or alicyclic diolefins, or less preferably polyolefins, e.g., allene, butadiene, isoprene, piperylene, octadienes, cyclohexadiene, cyclooctadiene, divinyl benzene, cyclododecatriene; $C_2$ to $C_{10}$ or higher, preferably $C_2$ to $C_6$ aliphatic or alicyclic acetylenes or acetylenes containing additional unsaturation (preferably internal (non-$\alpha$)) acetylenes ($\alpha$-acetylenes tend to spontaneously form acetylides), e.g., 2-butyne, 2-pentyne, 3-hexyne, etc. and $C_2$ to $C_{10}$ or higher, preferably $C_2$ to $C_6$ aliphatic or alicyclic saturated or unsaturated nitriles, e.g., acetonitrile, acrylonitrile, propionitrile, phenylnitrile, methacrylonitrile, ethacrylonitrile, etc. Pure streams or dilute streams (diluted with an inert gas or natural dilute petroleum streams e.g., butadiene diluted with butene and butanes) can be used so long as the diluent does not interfere with the precipitation of the desired solid complex. It is noted that CO does not form a complex with silver salts.

Reaction conditions for the above described precipitation or growth of the desired new particles of this invention are in general the well known temperatures and pressures within which the desired complex is stable. In general suitable stable temperatures and pressures varying with the particular complex are in the range of $-80$ to $80°$ C., preferably $-20$ to $30°$ C., and pressures are in the range of 1 to 165 p.s.i.a., preefrably 15 to 50 p.s.i.a. (higher pressures can be used but are not needed). In general higher pressures and lower temperatures within the above ranges as is well known stabilize the complexes.

Examples of preferred methods of preparation of the solid complexed silver salts from which the porous particles are obtained upon dissociation are as follows:

(1) PRECIPITATION FROM SOLVENT CONTAINING THE SILVER SALT COMPLEX IN SOLUTION BY COOLING

The liquid silver salt complex may be produced in a variety of ways. One technique for preparing the liquid silver salt complex is to bubble gaseous complexing compound, e.g., a diolefin through an aqueous solution of the silver salt at temperatures of e.g., 20 to 50° C. In lieu of employing gaseous complexing compounds liquids may be used.

To effect precipitation the solution is cooled preferably slowly so as to obtain precipitation of desired size complexed particles. Cooling is ordinarily conducted to a temperature in the range of −10 to +10° C. at which temperatures the solubilities of the silver salt complex are many fold reduced from that of the original room temperature solution. Precipitated solution is then separated from the solution by conventional means such as filtration.

(2) PRECIPITATION FROM UNCOMPLEXED SILVER SALTS IN SOLUTION

The silver salt is dissolved in a solvent, preferably water at temperatures of e.g., 20 to 50° C. and the solution is slowly added to a cold larger volume of water through which a gaseous complexing compound, e.g., butadiene is being continuously bubbled. Precipitated solution is then separated from the solution by conventional means such as filtration.

(3) SLURRY OF SOLID SILVER SALT WITH A SOLVENT CONTAINING THE COMPLEXING COMPOUND

The solid silver salt is suspended (slurried) in a liquid mixture of complexing compound e.g., a diolefin and a solvent in which the silver salt is more soluble than the complex, preferably alcohols, glycols and water and mixtures thereof. A suitable concentration of silver salt is used so that the mixture has only a slight solubility for the solid silver salt so as to create a driving force whereby the complexing compound and solvent cause a phase boundary between silver salt and silver salt complex to move through the particle to in effect grow a new complex particle. Another preferred solvent is nitriles, particularly employed with the same nitrile being used as the complexing compound e.g. acrylonitrile.

The amount of solvent used in slurry activation is not critical. Small amounts or large may be used although to some extent more large pore porosity is obtained with larger amounts. Thus any amount up to 90 wt. percent or more based on the liquid activating agent plus solvent mixture, preferably 10 to 50 wt. percent may be used. It should be noted that the active material and complexing material must be present in the liquid phase in the slurry operation. Thus, gas phase operations (e.g., crude butadiene which contains large amounts of isobutylene and butene-1) even conducted near the dew point so that trace condensation occurs on the commercial CP silver salt would not be effective to produce the new large pore porous silver salts of this invention. It is noted that operation at the dew point for long periods of time is equivalent to slurry operations. It is further noted that the activating agent may be dissolved in the liquid complexing agent or the complexing agent may be dissolved in the activating agent. Length of time required for ordinary slurry preparation is 0.1 to 20 hours, preferably 0.5 to 5 hours. It is also especially preferred to start with relatively pure silver salt, preferably above 90 wt. percent, more preferably above 95 wt. percent, yet more preferably above 97 wt. percent since contaminants in the crystal tend to block development of large pore porosity upon decomplexing besides also decreasing mechanical strength of the porous solid silver salt produced.

In all of the above preparations the precipitated crystalline product is separated from the solution and preferably dried with a low boiling solvent preferably diethyl ether or by any conventional drying means before dissociation. It is particularly important and preferred that this drying free of the solvent be completed before any dissociation is allowed to occur. The precipitated silver salt complexes are then dissociated under controlled conditions to provide the present new high large pore porosity silver salts which are many times more active than the initial silver salt employed in preparing the liquid complex. The conditions required for dissociation will obviously depend on the specific complex employed since each has its own dissociation pressure curves shown in the literature or as can be readily determined experimentally.

It is preferred to dissociate the complex both in preparation of the active particles and especially in multicycle use in effecting commercial separations in the substantial absence of solvents, i.e., to efficiently strip or wash the particles of solvents including those wetting the surface and pores before effecting dissociation of the complex in the decomplexer and also in the prestripper where partial dissociation may be used to obtain higher product purities. This is desirable because liquids having some appreciable solubility for the complex, present during dissociation, tend to anneal the large pores and thus reduce activity. Alcohols and glycols are particularly deleterious. It is noted that low boiling solvents tend to be completely stripped in raising temperatures before dissociation but it is still preferred to use care to obtain essentially complete removal before the dissociation or partial dissociation stripping step. Other deleterious materials are liquid nitriles and water. It is noted that the dissociation step appears to be critical, i.e., the main annealing occurs when the solvents are present during dissociation and little annealing occurs at other stages in the preparation or commercial use of the particles.

Finally and of very great importance it is preferred to conduct commercial complexing separations in the vapor phase at a temperature within 15° C., preferably within 10° C., more preferably within 5° C. of the dewpoint. With the new high large pore (550/10,000 A.) porosity particles which also contain small amounts of small, e.g., 70–500 A. pores, these small pores permit partial condensation in these pores and nucleation occurs to obtain much higher capacities and activities than are otherwise obtained.

The unique new solid silver salt particles of this invention are preferably used unsupported in vapor phase separation processes in which the said unsupported particles are continuously circulated, e.g., utilized as a fluid bed or otherwise suspended (e.g., dilute phase vs. dense phase fluid bed) in flowing vapors, utilized as a mechanically mixed bed, etc. suitable examples of equipment to achieve the latter are, e.g., rotary cement kilns (the rotor itself may carry all or part of the cooling coils), vibrating baffles, use of stirrers, etc. In all cases sufficient movement of the particles should be achieved to obtain efficient contacting and control of particle size. In connection with the highly preferred or necessary embodiment of using the new porous particles unsupported it is particularly necessary that the particles not be used in embodiments such as coating supports with a heavy oil to retain fine particles on the surface thereof. Such a technique which would fill the large pores with heavy oil would severely reduce the activity and capacity of the present new high large pore porosity particles. Thus, the open access of the particles to the vapors would be largely lost.

The process may be either continuous with circulation of solids between two beds (one operated on absorption and the other on desorption) or cyclic, i.e., the same reactor operated first on absorption and then on desorption. A particularly preferred method of carrying out a continuous process with circulation of the solids between the two beds is described in U.S. Patent No. 2,515,134, which patent is herewith incorporated by reference.

The present new silver salt particles and the above described processes for their use may be used in effecting more economic separations of any compound capable of forming a complex with silver salts. Thus, this includes all the separations described in the voluminous prior art previously referred to and additional compounds which it has been discovered complex with the active silver salts of this invention. Preferred materials which complex with silver salts are inorganic materials such as ammonia and organic materials containing up to about 16 carbon atoms, preferably up to about 12 carbon atoms, more preferably up to about 8 carbon atoms. The higher boiling materials can be complexed in the vapor phase by techniques such as the use of vacuum, carrier gases, etc. Any materials may be used as carrier gases which do not interfere with the complexing reaction e.g., inert gases, organic or inorganic materials. Examples of preferred materials which complex with the present silver salts are $C_2$–$C_{16}$, preferably $C_2$–$C_{12}$, more preferably $C_2$–$C_8$, compounds having one or more of the following functional groups through which the complex is capable of being formed: —C≡N, >C=C<, —C≡C—.

Unsaturated carbonyl compounds such as propenal, butenal, pentenal, and the like; the various unsaturated ketones such as 1-butene-3-one, 1,4-pentadiene-3-one, 2-pentene-4-one, and similar ketones may be employed. In general the alkane nitriles such as methane nitrile, ethane nitrile, propane nitrile, and higher nitriles are useful. Aryl, alkaryl and arylalkyl nitriles also complex with silver salts and may be used to form the liquid complex precursor. Unsaturated nitriles, such as acrylonitrile, methacrylonitrile, and ethacrylonitrile are further examples of ligands suitable for use in the present process. Ligands having a combination of functional groups selected from the list recited above are less preferred alternates. Also, other functional groups may be present so long as these do not interfere with complex formation.

Examples of olefins are ethylene, propylene, butylene, isobutylene, pentenes, etc.

While alpha, non-alpha, straight and branched chain olefins are all employable, alpha olefins appear to complex more readily, presumably due to the absence of steric hindrance and are preferred. Di- and triolefins such as propadiene, butadiene, isoprene, dicyclopentadiene, cyclopentadiene, octadiene, cyclododecatriene and the like, readily complex. Olefinic aromatic compounds such as styrene and the like may also be employed. Alpha acetylenes such as methyl, ethyl, vinyl, propyl acetylenes and the like, as well as acetylene per se may be used as ligands. However, these materials tend to spontaneously form acetylides and therefor non-alpha internal acetylenes such as 2-hexyne, 2-isopentyne, etc. are preferred. It should be noted that compounds containing functional groups in addition to the functional group (s) through which the complex is formed may also be employed since they do not ordinarily interfere with complexing. Also, compounds containing more than one functional group through which the complex is capable of being formed may by proper choice of conditions (chosen based on the temperature pressure dissociation curve) be separated from another compound having one of the same functional groups, e.g., acrylonitrile from acetonitrile.

In general, vapor phase complexing is conducted under conditions such that the partial pressure of the ligand to be reacted is above the dissociation pressure of a complex of the ligand with the silver salt for a sufficient time for appreciable complexing to occur. Similarly, vapor phase decomplexing is conducted under conditions such that the partial pressure of the ligand to be reacted is below the dissociation pressure of a complex of the ligand with the silver salt for a sufficient time for appreciable decomplexing to occur.

Preferred complexing and decomplexing conditions used for effecting preferred commercial separations are as follows: (Preferred superficial velocity fluidization rates 0.05–5.0, preferably 0.15–1.0 ft./sec.)

| | Preferred | Most Preferred |
|---|---|---|
| Butadiene Separated from Crude Butadiene, Complexing: | | |
| Temperature, °C | −10 to 70 | 0 to 40 |
| Pressure, atmos | 0.5 to 10 | 1 to 5 |
| Gas Residence Time, seconds | 1 to 400 | 15 to 150 |
| Solids Residence Time, minutes | 1 to 200 | 3 to 70 |
| Decomplexing: | | |
| Temperature, °C | 40 to 100 | 60 to 90 |
| Pressure, atmos | 0.5 to 10 | 1 to 5 |
| Gas Residence Time, seconds | 1 to 400 | 15 to 150 |
| Solids Residence Time, minutes | 1 to 200 | 3 to 70 |
| Ethylene Separated from Steam Cracking $C_2$-Stream, Complexing: | | |
| Temperature, °C | −50 to 40 | −30 to 20 |
| Pressure, atmos | 1 to 100 | 10 to 60 |
| Gas Residence Time, seconds | 1 to 400 | 15 to 150 |
| Solids Residence Time, minutes | 1 to 200 | 3 to 70 |
| Decomplexing: | | |
| Temperature, °C | −5 to 100 | 35 to 75 |
| Pressure, atmos | 1 to 100 | 10 to 60 |
| Gas Residence Time, seconds | 1 to 400 | 15 to 150 |
| Solids Residence Time, minutes | 1 to 200 | 3 to 70 |
| Acrylonitrile Separated Acetonitrile, Complexing: | | |
| Temperature, °C | −10 to 80 | 0 to 50 |
| Pressure, atmos | 0.5 to 10 | 1 to 5 |
| Gas Residence Time, seconds | 1 to 400 | 15 to 150 |
| Solids Residence Time, minutes | 1 to 200 | 3 to 70 |
| Decomplexing: | | |
| Temperature, °C | 50 to 140 | 70 to 120 |
| Pressure, atmos | 0.5 to 10 | 1 to 5 |
| Gas Residence Time, seconds | 1 to 400 | 15 to 150 |
| Solids Residence Time, minutes | 1 to 200 | 3 to 70 |
| Allene Separated from Methyl Acetylene, Complexing: | | |
| Temperature, °C | −40 to 70 | −20 to 40 |
| Pressure, atmos | 0.5 to 25 | 1 to 15 |
| Gas Residence Time, seconds | 1 to 400 | 15 to 150 |
| Solids Residence Time, minutes | 1 to 200 | 3 to 70 |
| Decomplexing: | | |
| Temperature, °C | 30 to 115 | 50 to 100 |
| Pressure, atmos | 0.5 to 25 | 1 to 15 |
| Gas Residence Time, seconds | 1 to 400 | 15 to 150 |
| Solids Residence Time, minutes | 1 to 200 | 3 to 70 |
| Piperylenes Separated from Cyclopentene, Complexing: | | |
| Temperature, °C | −10 to 80 | 0 to 70 |
| Pressure, atmos | 0.1 to 5 | 1 to 3 |
| Gas Residence Time, seconds | 1 to 400 | 15 to 150 |
| Solids Residence Time, minutes | 1 to 200 | 3 to 70 |
| Decomplexing: | | |
| Temperature, °C | 40 to 125 | 60 to 110 |
| Pressure, atmos | 0.1 to 5 | 1 to 3 |
| Gas Residence Time, seconds | 1 to 400 | 15 to 150 |
| Solids Residence Time, minutes | 1 to 200 | 3 to 70 |

NOTE.—For the nitrile separations an inert carrier gas, such as $N_2$ $CH_4$, etc. must be used to prevent condensation at the high pressures.

NOTE.—To operate with piperylenes at low temperature and the higher pressures a carrier gas such as nitrogen must be used.

The present invention will be more clearly understood from a consideration of the following examples and the laboratory data contained therein.

EXAMPLE 1

A saturated solution of commercial 99.8% pure $AgNO_3$ in distilled water at 22° C. was saturated with 1,3-butadiene (99% pure). Then the solution was cooled to 0° C. to allow the small yellow crystals of $AgNO_3$-butadiene complex to crystallize out. The crystals were filtered off and washed with cold anhydrous alcohol followed by cold anhydrous ether. The crystals were finally dried in flowing 1,3-butadiene vapor and stored under a butadiene atmosphere. Examination of the crystals under a microscope showed that they remained transparent under a butadiene atmosphere but in the absence of a butadiene atmosphere each particle decomposed into a sponge-like mass of tiny crystallites retaining the overall shape and size of the original particle. The size of the particles both before and after decomplexing ranged from 50 to 1000$\mu$, predominantly 50 to 200$\mu$. Butadiene was evolved during this change. Comparison of the dissociation pressure curves for these crystals with those reported in J.A.C.S. 84, 2893 (1962) shows that the crystals consist substantially of the 1AgNO₃:1 butadiene complex. Dissociation of a sample of the complex on a quartz spring balance showed 17.6 wt. percent butadiene in the crystals compared to theoretical values of 13.7 wt. percent for the 2AgNO₃:1 butadiene and 24.1 wt. percent for the 1AgNO₃:1 butadiene complexes.

Mercury porosimeter measurements of the pore volume of AgNO₃ samples prepared as above described were made as follows:

(1) Sample tested immediately following dissociation.—A sample of the complexed AgNO₃ from storage under butadiene atmosphere was introduced into the capsule of the mercury porosimeter. The pressure was reduced to <1 mm. absolute (vacuum pump) at room temperature and held for 1 hour to effect dissociation. Porosimeter readings were taken immediately following the 1 hour dissociation period.

(2) Sample tested 16–20 hours after dissociation.—The same procedure as described in (1) was used for this test except that the sample was allowed to stand overnight (under vacuum after the vacuum was applied) before readings were taken the next day.

|  | Pore Volume cc./gm. | | |
|---|---|---|---|
|  | 70–550 A. | 550–10,000 A. | >10,000 A. |
| AgNO₃ tested immediately following dissociation (1). | 0.013 | 0.039 | 0.089 |
| AgNO₃ tested 16–20 hours after dissociation (2). | 0.003 | 0.000 | 0.080 |

From these porosimeter measurements it can be seen that the large 550–10,000 A. pores comprise 30% of the total volume of a particle in Sample 1 and that standing overnight uncomplexed destroys this porosity (storage as the complex does not harm porosity). It is further noted that the Sample 1 particles also contain some small pores in the 70–550 A. size range. As to the >10,000 A. (1μ) measurement this is probably mainly spaces between particles and thus essentially meaningless with respect to the pore volume of the present particles. It is presented merely for completeness.

EXAMPLE 2

A 41 g. sample of the complex prepared in Example 1 was charged to a fixed bed reactor consisting of a 12-inch length of ½ inch diameter stainless steel tubing provided with a ⅛ inch diameter stainless steel thermocouple well running down the axis of the ½-inch tube. A thermocouple was placed in the thermowell, a pressure gage was attached to the top of the tube, and the tube was placed in a constant temperature bath. The tube was heated to 100° C. at 0.3 mm. Hg absolute pressure to decompose the butadiene complex and then cooled to 0° C. by placing it in a wet ice bath. After the AgNO₃ bed reached 0° C. it was charged rapidly with C.P. ethylene to 300 p.s.i.g. and the charging valve was closed. In 15 seconds the bed temperature rose to 46° C. and the pressure dropped to 150 p.s.i.g. After the AgNO₃ would absorb no more ethylene, the pressure was reduced to atmospheric at 0° C. and the reactor was then heated to 90° C. at atmospheric pressure with the ethylene evolved being measured with a wet test meter. The 3.40 liters of ethylene evolved corresponds to 72% of the theoretical 1AgNO₃:1 ethylene complex. Similarly the 17.6 wt. percent butadiene in Example 1 corresponds to 73% of the theoretical 1:1 AgNO₃-butadiene complex. The inactive remainder is probably AgNO₃ precipitated from the original solution as AgNO₃ and not complex.

EXAMPLE 3

A sample of commercial high purity AgNO₃ was ground to a fine powder and treated the same way as in Example 2. The temperature rise and the pressure decrease were both negligible. This shows that ordinary high purity AgNO₃ is not active for reaction with gaseous ethylene.

EXAMPLE 4

A sample of the butadiene-AgNO₃ complex as prepared in Example 1 was placed in the apparatus of Example 2. The pressure gage was replaced by a vacuum gage (Wallace & Tiernan Aneroid Monometer) of 500 cc. volume and the gage was filled with C.P. butadiene at 1 atmosphere. The complex was decomposed by vacuum and the apparatus was cooled to 0° C. The vacuum gage was then opened to let the butadiene into the AgNO₃ bed and the temperature and pressure were observed. A similar test was made with the commercial high purity AgNO₃.

| AgNO₃ | Temp. Rise, ° C./min. | Pressure Drop, mm. Hg/min. |
|---|---|---|
| From Complex of Example 1 | 9 | 885 |
| Commercial | 0.0 | 0.0 |

EXAMPLE 5

A sample of the active AgNO₃ obtained by evacuating the butadiene from the complex of Example 1 was placed in the apparatus of Example 2. It was then held overnight at room temperature under a pressure of 340 p.s.i.g. of 47 wt. percent ethylene–53 wt. percent ethane mixture. The pressure was then reduced to atmospheric and the tail gas obtained was analyzed by gas chromatography. The bed was then briefly evacuated at 0° C. and finally heated to 70° C. to release any complexed ethylene. The gas obtained at 70° C. was also analyzed.

Composition
Sample: wt. percent ethylene
    Feed gas _____ 47
    Tail gas _____ 42
    Product at 70° C. _____ 96

This shows that solid AgNO₃ can be used to separate ethylene from non-complexing gases in high purity.

EXAMPLE 6

324 grams of AgNO₃-C₄⁼⁼ complex of Example 1 was placed in a vertical 1-inch diameter x 2 foot long jacketed glass fluid bed reactor. The complex was decomposed by blowing N₂ into the bottom of the bed of fluidized complex particles for 8 hours until all traces of C₄⁼⁼ were removed. The complex and the product AgNO₃ both fluidized very well. A piperylene-cyclopentene mixture was then charged to the fluid bed by bubbling nitrogen through it to saturate the N₂ at 0° C. The N₂–C₅ mixture was then fed to the fluid bed which was also held at 0° C. The gas feed rate was 2.6 liters per minute and a total of 77 ml. of hydrocarbon was fed to the bed. The bed was then purged with N₂ and then warmed up to 18° C. with pure N₂ flowing through it and into a cold trap to catch the decomplexed product. Twelve cc. of C₅ product were obtained during the decomplexing step. All samples were analyzed by gas chromatography.

| Sample | Composition, Wt. percent | | |
|---|---|---|---|
| | trans Piperylene | cis Piperylene | Cyclopentene |
| Feed | 61.8 | 26.2 | 12.0 |
| Unreacted Tail Gas | 66.4 | 23.3 | 10.4 |
| Decomplexed Product | 52.3 | 27.5 | 20.2 |

These data show that cyclopentene was selectively complexed even though it was present to the smallest extent in the feed. All of these olefins complex with $AgNO_3$ and can thus be easily separated from paraffins.

EXAMPLE 7

Active $AgNO_3$ prepared as in Example 1 was reacted with vapors from the following olefins and the dissociation pressures of the resulting complexes were determined.

| | |
|---|---|
| Ethylene | Cyclopentene |
| Propylene | Allene |
| 1-butene | 1,3-butadiene |
| cis-2-butene | cis-piperylene |
| cis-2-pentene | Acetylene [1] |
| 1-pentene | |

[1] Only one data point was obtained because of the hazard of acetylide formation. Caution should be observed in working with acetylenes since it was determined that acetylides actually did form upon allowing the complex to stand and were explosive. It is further noted that the other complexes are only mildly sensitive to extremely strong shock and therefore can be used commercially under normal conditions with only minor inexpensive safety precautions. These data show that the unsaturates listed above can be readily recovered from their mixtures with saturates from other noncomplexing materials, and from each other by proper choice of reaction conditions. Dissociation pressure curves for a number of the complexes are given in the drawing.

It is to be understood that this invention is not limited to the specific examples, which have been offered merely as illustrations, and that modifications may be made without departing from the spirit of this invention.

What is claimed is:

1. A process for the separation of a $C_2$–$C_{16}$ cis monoolefin compound capable of forming a complex with a silver salt selected from the group consisting of $AgNO_3$, $AgClO_4$, $AgClO_3$, $AgBF_4$, and $Ag_2SiF_6$ from its corresponding trans compound contained in a mixture therewith which comprises contacting said mixture in the vapor phase with solid porous unitary particles of a silver salt selected from the group consisting of $AgNO_3$, $AgClO_4$, $AgClO_3$, $AgBF_4$, and $Ag_2SiF_6$, said particles having a porosity of above 10% (of the total volume of the particle) 550–10,000 A. pores and being above 50% 10–600 micron particles, under conditions to form a complex between said compound and said complexing agent, and subsequently dissociating said complex to recover said compound.

2. The process of claim 1 wherein the complexing is carried out at a temperature within 10° C. of the dew point of the mixture contacted.

3. The process of claim 1 wherein the cis monoolefin is cis-2-butene.

4. The process of claim 1 wherein the cis monoolefin is cis-2-pentene.

References Cited

UNITED STATES PATENTS

| | | | |
|---|---|---|---|
| 3,070,642 | 12/1962 | Krous et al. | 260—681.5 |
| 3,189,658 | 6/1965 | Quinn et al. | 260—681.5 |
| 3,265,591 | 8/1966 | Halliwell | 260—681.5 |

DELBERT E. GANTZ, *Primary Examiner.*

J. D. MYERS, *Assistant Examiner.*